Feb. 21, 1956 B. F. ARPS 2,735,200
DUAL-ACTION BULL DOZER TRACTOR ATTACHMENT
Filed Sept. 15, 1951 6 Sheets-Sheet 1

INVENTOR.
BRUNO F. ARPS
BY ASKroh
ATTORNEY

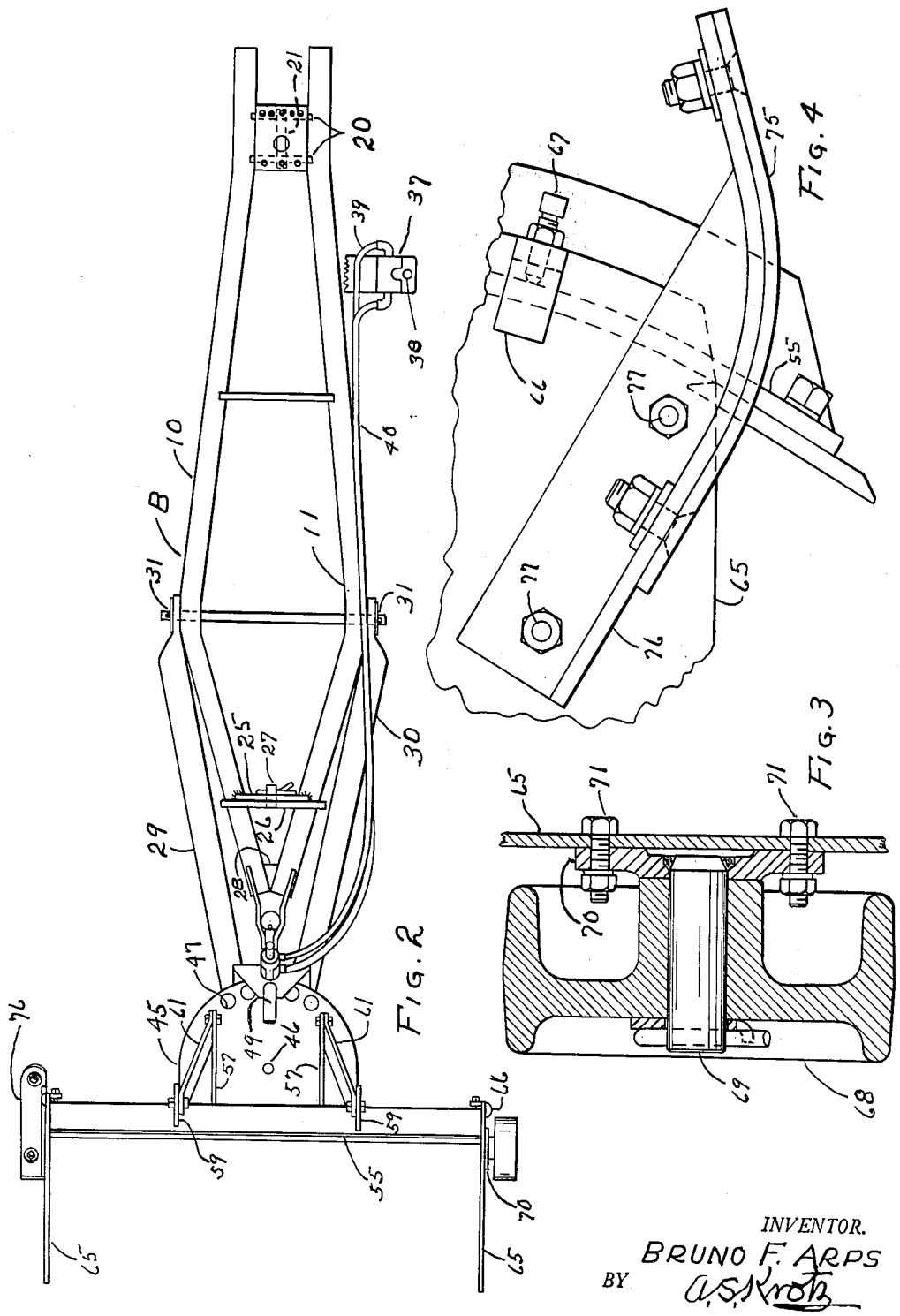

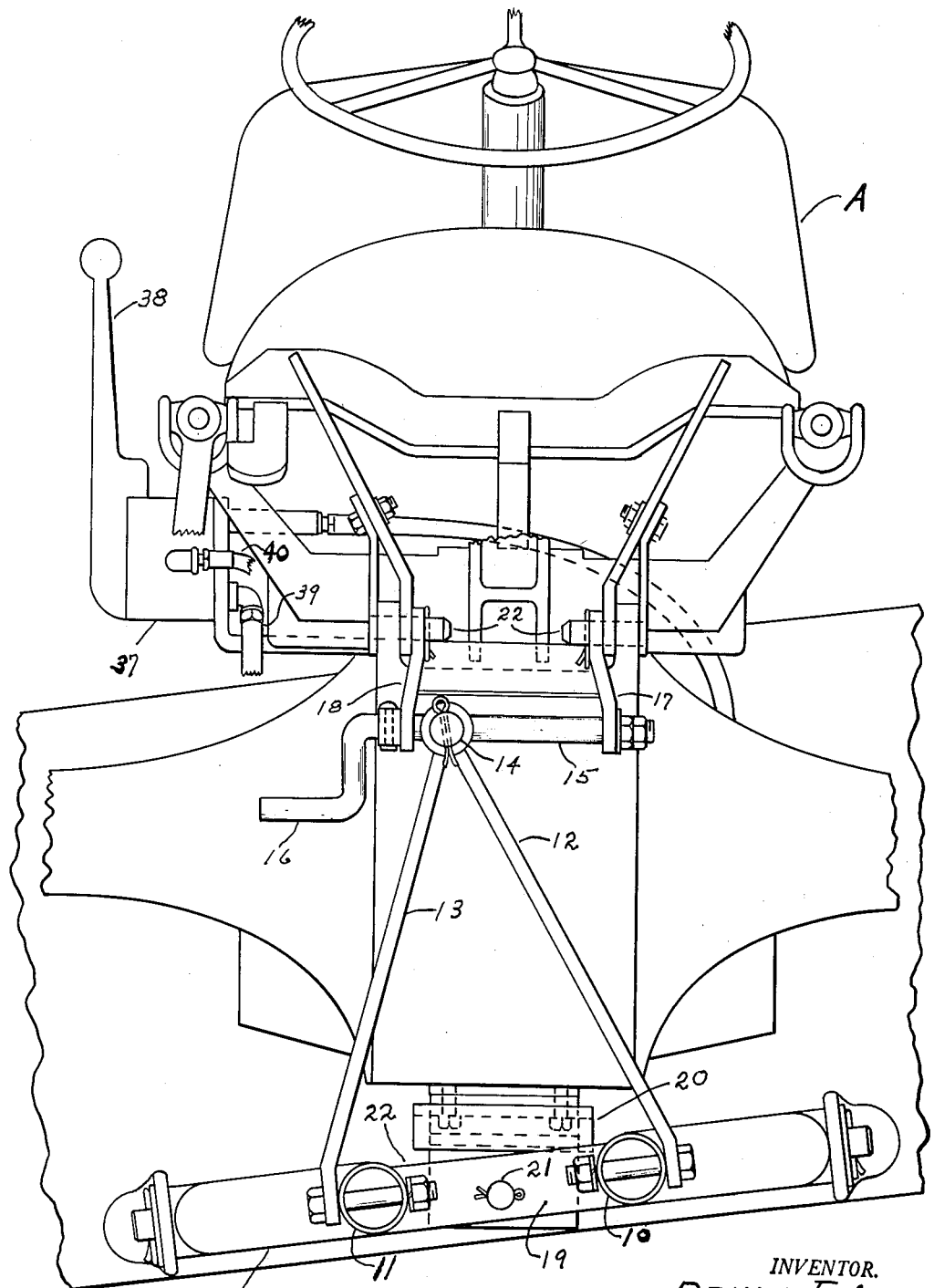

Feb. 21, 1956  B. F. ARPS  2,735,200
DUAL-ACTION BULL DOZER TRACTOR ATTACHMENT
Filed Sept. 15, 1951  6 Sheets-Sheet 4

INVENTOR.
BRUNO F. ARPS
BY A.S.Krotz
ATTORNEY

Feb. 21, 1956 B. F. ARPS 2,735,200
DUAL-ACTION BULL DOZER TRACTOR ATTACHMENT
Filed Sept. 15, 1951 6 Sheets-Sheet 5
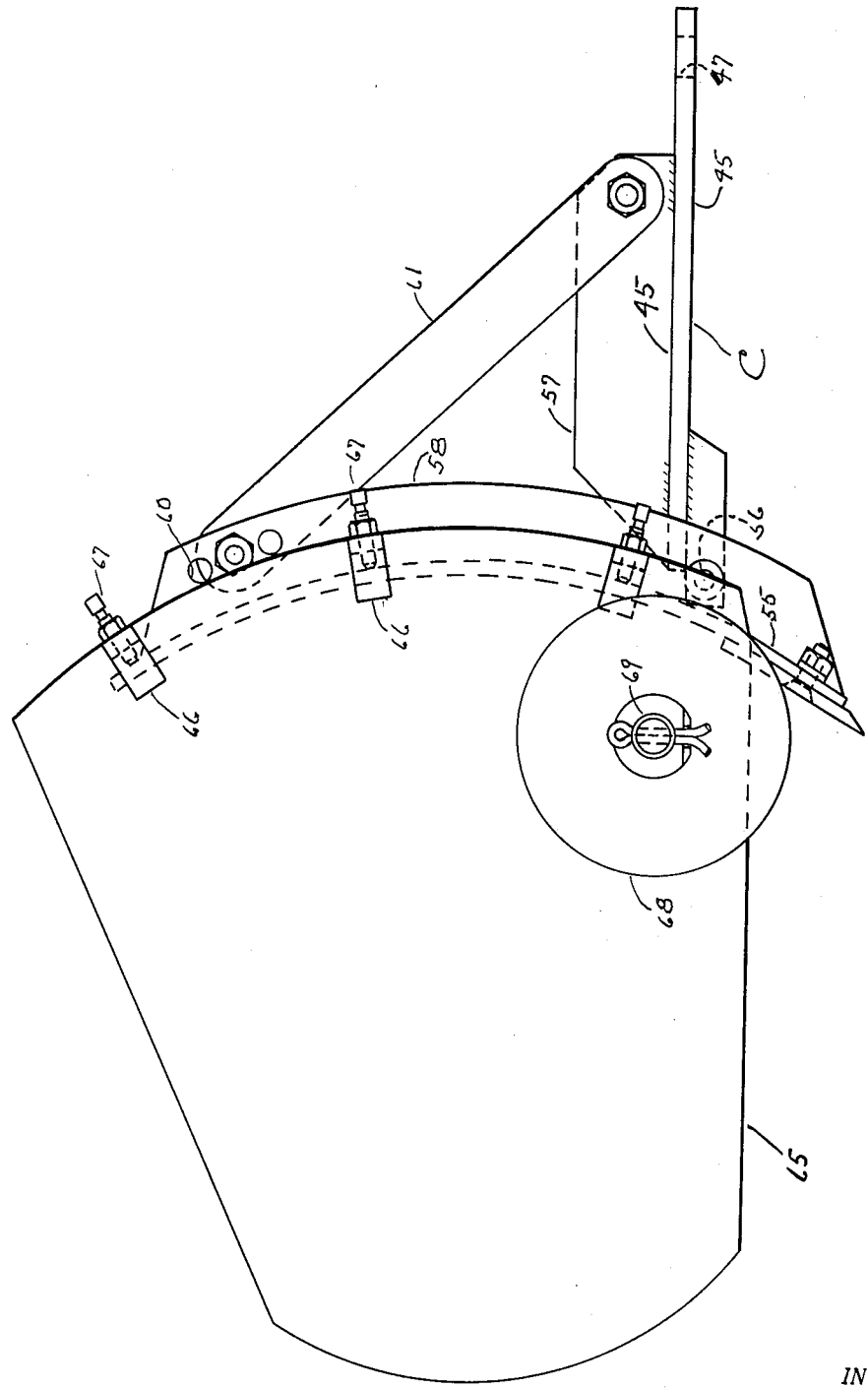
INVENTOR.
BRUNO F. ARPS
BY *A. S. Krotz*
ATTORNEY Feb. 21, 1956 — B. F. ARPS — 2,735,200
DUAL-ACTION BULL DOZER TRACTOR ATTACHMENT
Filed Sept. 15, 1951 — 6 Sheets-Sheet 6
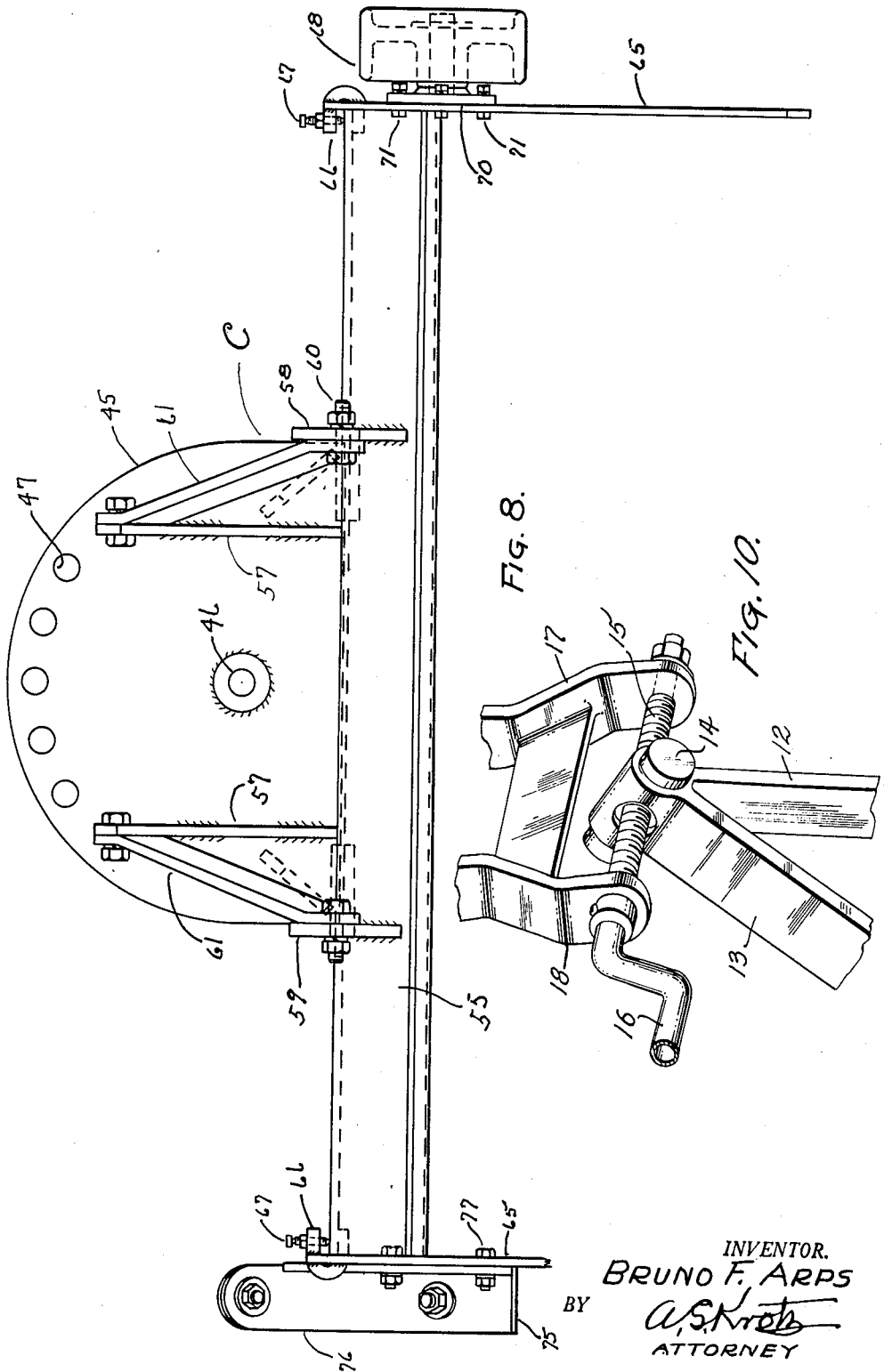
INVENTOR.
BRUNO F. ARPS
BY A.S.Kroh
ATTORNEY United States Patent Office 2,735,200
Patented Feb. 21, 1956

2,735,200
DUAL-ACTION BULL DOZER TRACTOR ATTACHMENT

Bruno F. Arps, New Holstein, Wis., assignor to Arps Corporation, New Holstein, Wis.

Application September 15, 1951, Serial No. 246,767

2 Claims. (Cl. 37—144)

Objects of the present invention are to provide an efficient bull dozer attachment which can be easily attached and detached and can be conveniently controlled by the operator of the tractor.

A further object of the present invention is to provide convenient means for changing the various angles of the scraper blade and for controlling the vertical position of the blade when used as a bull dozer or for terracing.

Important objects of the present invention are to provide a hydraulic lift for the scraper mechanism and a tilting mechanism, the controls of which are each within reach of the operator of the tractor.

To these and other useful ends, my invention consists of parts, combinations of parts, or their equivalents, and mode of operation as hereinafter described, and claimed and shown in the accompanying drawings in which:

Fig. 2 is a top view of my device as shown in Figure 1.

Figs. 3 and 4 are details of a ground-engaging means for supporting and controlling the operating depth or vertical position of the scraper blade.

Fig. 5 is a fractional rear view of the tractor shown in Figure 1, illustrating a rear end view of the frame of my device and my novel supporting and tilting means.

Fig. 8 is a top view of the scraper blade and its supporting frame.

Fig. 9 is a side elevational view of the parts shown in Figure 8.

Fig. 10 is a fragmentary detail view of the rotatable shaft and the hanger bars which mount it.

Figure 1:
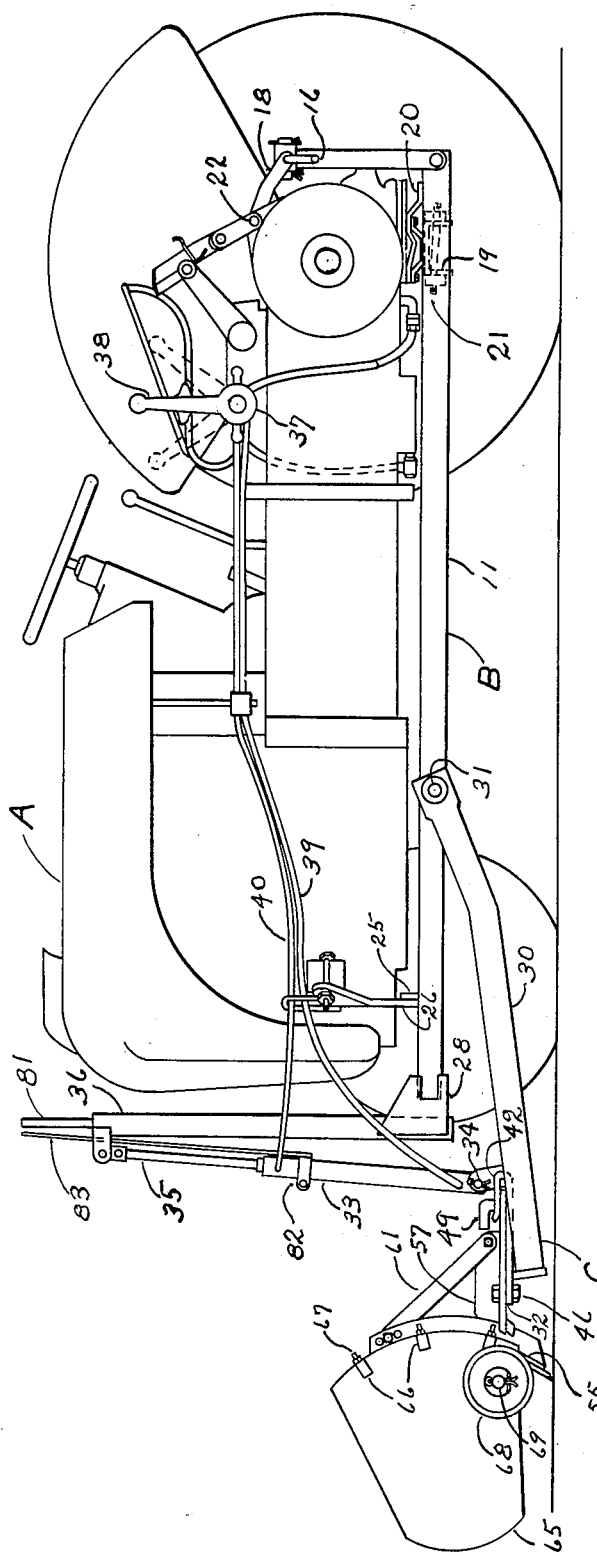
Fig. 1 is a fractional side elevational view of a conventional tractor having mounted thereon my device.
Figure 6:
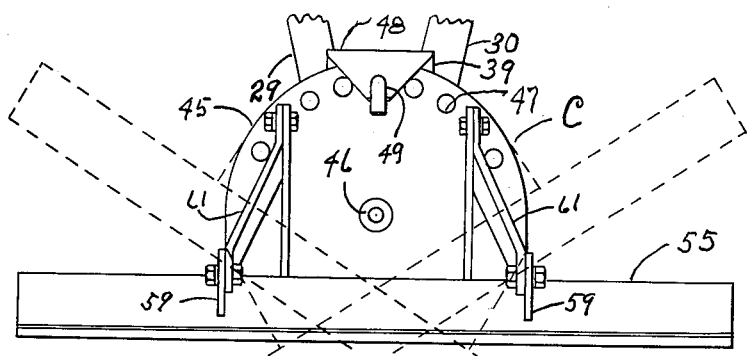
Fig. 6 is a fractional view of the front end of my device illustrating the means for changing the transverse angle of the scraper blade.
Figure 7:
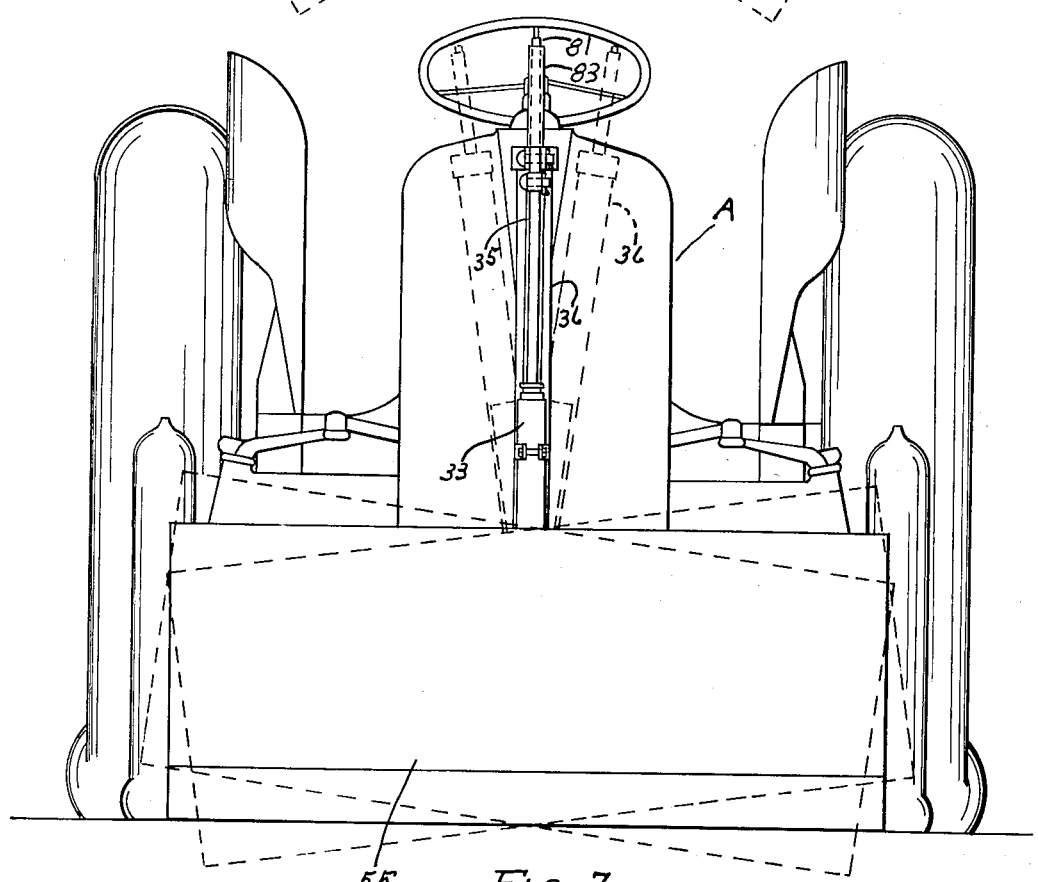
Fig. 7 is a front view of the assembly shown in Figure 1, illustrating the horizontal position of the scraper blade and the hydraulic ram in full lines and the tilted position in opposite direction by dotted lines.

As thus illustrated the tractor in its entirety is designated by reference character A.

The main frame of my device in its entirety is designated by reference character B.

The scraper frame is in its entirety designated by reference character C.

Member A may be of any conventional design, as shown it is an illustration of a well known tractor. My device comprises the main frame B which extends past the rear and front ends of the tractor. My invention resides principally in its connections to the tractor and means for controlling the device.

Figure 5 illustrates the rear connection of frame B to the tractor. Frame B comprises side bars 10 and 11, the rear ends of which are secured to converging bars 12 and 13 as shown and being rotatably secured to an elongated nut 14, through which a shaft 15 is screw-threaded as is shown in Fig. 10. This shaft at one end has a crank 16 and is rotatably mounted on anchor bars 17 and 18.

Member B is at its rear end hinged to the tractor as follows:

Near the rear ends of members 10 and 11 I secure a transverse frame member 19, a bracket 20 is attached to the tractor near its rear end, its lower end contacting one side of member 19. Members 19 and 20 are hinged together by means of a hinge pin 21. It will be seen that member B can be rocked to the right or left on this hinge pin by turning crank 16 to the right or left, thus moving elongated nut 14 to the right or left. Members 17 and 18 are pivoted at their front ends to the tractor as at 22—22, thus to permit nut 14 to swing on a radius with hinge pin 21.

Member 14 it will be seen acts as a means for tilting the frame and the tilting is done by crank 16. In Figure 5 the frame is shown as being tilted to the left; crank 16 may be operated so as to tilt the frame in the opposite direction.

Frame B is pivotally supported on the front end of the tractor frame as follows:

Transverse member 25 is secured to members 10 and 11 and a bracket 26 is secured preferably to the tractor frame and positioned to contact member 25 having a pivot pin 27 (see Figure 2). By referring to Figure 2 it will be seen that the forward ends of members 10 and 11 converge, their ends being secured to a bracket 28 on which I mount a post as will hereinafter appear.

Frame C comprises two rearwardly diverging bars 29 and 30, their rear ends being pivoted to members 10 and 11 as at 31—31, their forward ends being secured to a bracket 32 (see Figure 1). A hydraulic cylinder 33 is at its lower end transversely pivotly secured to bracket 32 as at 34. Piston 35 of cylinder 33 is at its upper end suitably secured to a post 36, which is rigidly secured to bracket 28.

I provide means for raising and lowering the front end of member C as follows:

A valve 37 having a lever 38 is mounted on the tractor within easy reach of the operator, the valve having an operating connection with a source of oil pressure. Valve 37 has operating connections to ram 33 by means of flexible tubes 39 and 40; thus the operator may raise and lower frame C at will by manipulating lever 38.

A plate 45 is pivoted to bracket 32 as at 46, the rear edge of this plate being on a radius with pivot 46 (see Figure 8). This edge is provided with a number of openings 47 which are also on a radius with pivot 46. Member 32 is provided with an over hanging bracket 48, having an opening which registers with an opening 47. A linch-pin 49 is provided which extends through an opening in bracket 48, bracket 32 and through any one of openings 47. Thus plate 45 may be locked in any desired position which makes it suitable for carrying the scraper blade 55 which is pivoted to the forward end of plate 45 as at 56 (see Figure 9). Plate 45 is provided with flanges 57—57 (see Figures 1 and 8) and scraper 55 is provided with flanges 58 and 59, these flanges have a number of openings 60 at their upper ends (see Figure 1) to any one of which braces 61—61 may be secured. The rear ends of these braces are secured to flanges 57 as illustrated.

Thus it will be seen that the scraper blade may be positioned transverse to the direction of travel or at an angle in either direction and tilted forwardly or rearwardly for obvious reasons.

In operating a device of the character described, especially as a bull dozer with the scraper blade in a transverse position, it is frequently desirable to allow the scraper blade to ride freely on a concrete road surface. At other times it may be desirable to carry the scraper blade on wheels or runners so as to measure the depth of cut. For these purposes I provide means as follows:

Retaining plates 65—65 are provided for retaining the dirt as it accumulates in front of the scraper. These retaining plates are provided with a number of clamps 66, adapted to embrace the end edges of blades 55, each clamp having a set-screw 67, so plate 65 may be adjusted to any desired height on the scraper blade and firmly locked by means of the set-screws 67. Carrying wheels 68 are rotatably mounted on spindles 69, the spindles being secured to spindle plate 70. These spindle plates are secured to plates 65 by means of bolts 71. Plates 65 may be provided with a number of vertically spaced openings for the reception of bolts 71, so wheels 68 may be adjusted vertically on plates 65.

The other means for carrying the scraper blade is shown in Figure 4 comprising a runner 75, suitably secured to a bracket 76, the bracket being secured to plate 65 by means of bolts 77—77. A number of vertically arranged holes may be provided in plate 65 so members 76 may be adjusted vertically relative to plate 65.

Thus it will be seen that I have provided a dual-action bull dozer which is removably attached to the tractor and having means whereby most of the controls are within easy reach of the tractor operator and having other means for adjusting the scraper blade to a multiplicity of operations.

I provide a novel means for indicating to the driver the vertical position of the scraper or bull dozer blade, comprising visual means as to the depth of penetration for accumulating material ahead of the blade and as to the position of the blade for disposing of the accumulated material, comprising a post 81 secured to member 36 having a suitable height. A clamp 82 is fastened to member 33 having secured thereto a bar 83, the upper end of which is in line with the top of member 81 when the lower surface of the scraper blade is about in line with the lower edge of the carrying wheels as shown in Figure 1; thus the upper end of member 83 will visually indicate to the driver the vertical position of the scraper blade.

Having thus shown and described my invention, I claim:

1. A bull dozer attachment for a standard tractor, comprising a main frame longitudinally hingedly connected to opposite ends of the tractor; manually operated means connected to the main frame for tilting it including a transverse shaft having means for manually turning it, bearings on opposite ends of said shaft having connections with the tractor frame for free vertical movement of the shaft, bars secured to end portions of the main frame and converging upwardly and being hingedly connected at their upper ends to the shaft; a supplemental frame transversely hingedly connected to the main frame; a scraper blade mounted on the forward end portion of said supplemental frame; and a hydraulic ram forming an operating connection between the main frame and the supplemental frame.

2. A bull dozer attachment for a standard tractor, comprising a main frame longitudinally hingedly connected to opposite ends of the tractor; manually operated means connected to the main frame for tilting it including a transverse shaft having means for manually turning it, bearings on opposite ends of said shaft having link connections with the tractor frame for free vertical movement of the shaft, portions of the shaft threaded and carrying a nut, bars secured to end portions of the main frame and converging upwardly and being hingedly connected at their upper ends to the nut; a supplemental frame transversely hingedly connected to the main frame; a scraper blade mounted on the forward end portion of said supplemental frame; and a hydraulic ram forming an operating connection between the main frame and the supplemental frame.

References Cited in the file of this patent

UNITED STATES PATENTS

| Number | Name | Date |
| --- | --- | --- |
| 1,466,464 | Beatty | Aug. 28, 1923 |
| 1,522,378 | McLeod et al. | Jan. 6, 1925 |
| 1,861,731 | Wooldridge | June 7, 1932 |
| 1,864,639 | Crezee | June 28, 1932 |
| 2,057,326 | Coates | Oct. 13, 1936 |
| 2,088,564 | Anthony et al. | Aug. 3, 1937 |
| 2,166,424 | Coates | July 18, 1939 |
| 2,242,826 | Keeler | May 20, 1941 |
| 2,333,837 | Wibbels | Nov. 9, 1943 |
| 2,374,298 | Nasset | Apr. 24, 1945 |
| 2,426,410 | Owen | Aug. 26, 1947 |
| 2,464,003 | Stadler | Mar. 8, 1949 |
| 2,522,583 | Remington | Sept. 19, 1950 |
| 2,539,174 | Baideme et al. | Jan. 23, 1951 |
| 2,545,739 | Martin | Mar. 20, 1951 |
| 2,559,816 | Alexander | July 10, 1951 |
| 2,589,896 | Toland | Mar. 18, 1952 |